US006363075B1

(12) United States Patent
Huang et al.

(10) Patent No.: US 6,363,075 B1
(45) Date of Patent: Mar. 26, 2002

(54) SHARED BUFFER MANAGEMENT MECHANISM AND METHOD USING MULTIPLE LINKED LISTS IN A HIGH SPEED PACKET SWITCHING SYSTEM

(75) Inventors: Paul Huang, Taipei; Huan-Pin Tseng, Hsin-Chu; Yao-Tzung Wang, Hsin-Chu; Tai-Chung Chang, Hsin-Chu; Kuo-Yen Fan, NanTou Hsien, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/012,225

(22) Filed: Jan. 23, 1998

(51) Int. Cl.[7] .............................................. H04L 12/56
(52) U.S. Cl. ...................... 370/412; 370/428; 370/390
(58) Field of Search ........................ 370/389, 390–394, 370/412, 413, 414, 415, 416, 417, 428, 375, 378, 379, 395; 711/147, 153, 170, 156; 709/213, 214, 215, 216

(56) References Cited

U.S. PATENT DOCUMENTS

| | | | |
|---|---|---|---|
| 5,274,642 A | 12/1993 | Widjaja et al. | 370/411 |
| 5,361,372 A | 11/1994 | Rege et al. | 709/234 |
| 5,406,556 A | 4/1995 | Widjaja et al. | 370/381 |
| 5,432,908 A | 7/1995 | Heddes et al. | 711/147 |
| 5,528,588 A | 6/1996 | Bennett et al. | 370/396 |
| 5,535,197 A | * 7/1996 | Cotton | 370/414 |
| 5,610,914 A | * 3/1997 | Yamada | 370/395 |
| 5,825,773 A | * 10/1998 | Shutoh et al. | 370/398 |
| 5,898,687 A | * 4/1999 | Harriman et al. | 370/390 |
| 6,021,132 A | * 2/2000 | Muller et al. | 370/412 |

* cited by examiner

Primary Examiner—Chau Nguyen
Assistant Examiner—Soon-Dong Hyun
(74) Attorney, Agent, or Firm—Birch, Stewart, Kolasch & Birch, LLP

(57) ABSTRACT

A shared memory management mechanism and method for a high-speed network releases network packets efficiently and maintains the requirement of First In First Out. A series of linked lists including a linked list for each output queue and a linked list of used broadcast packets aids a buffer manager in efficiently managing the buffers in the shared memory. The linked lists include a special data format that encodes the broadcast status, links, and whether the next entry in the list is for unicast or broadcast frames. A scanning procedure scans the broadcast status to efficiently release the broadcast frame buffers. A dynamic scanning procedure consumes less bandwidth than the scanning procedure to efficiently release the broadcast frame buffers.

29 Claims, 19 Drawing Sheets

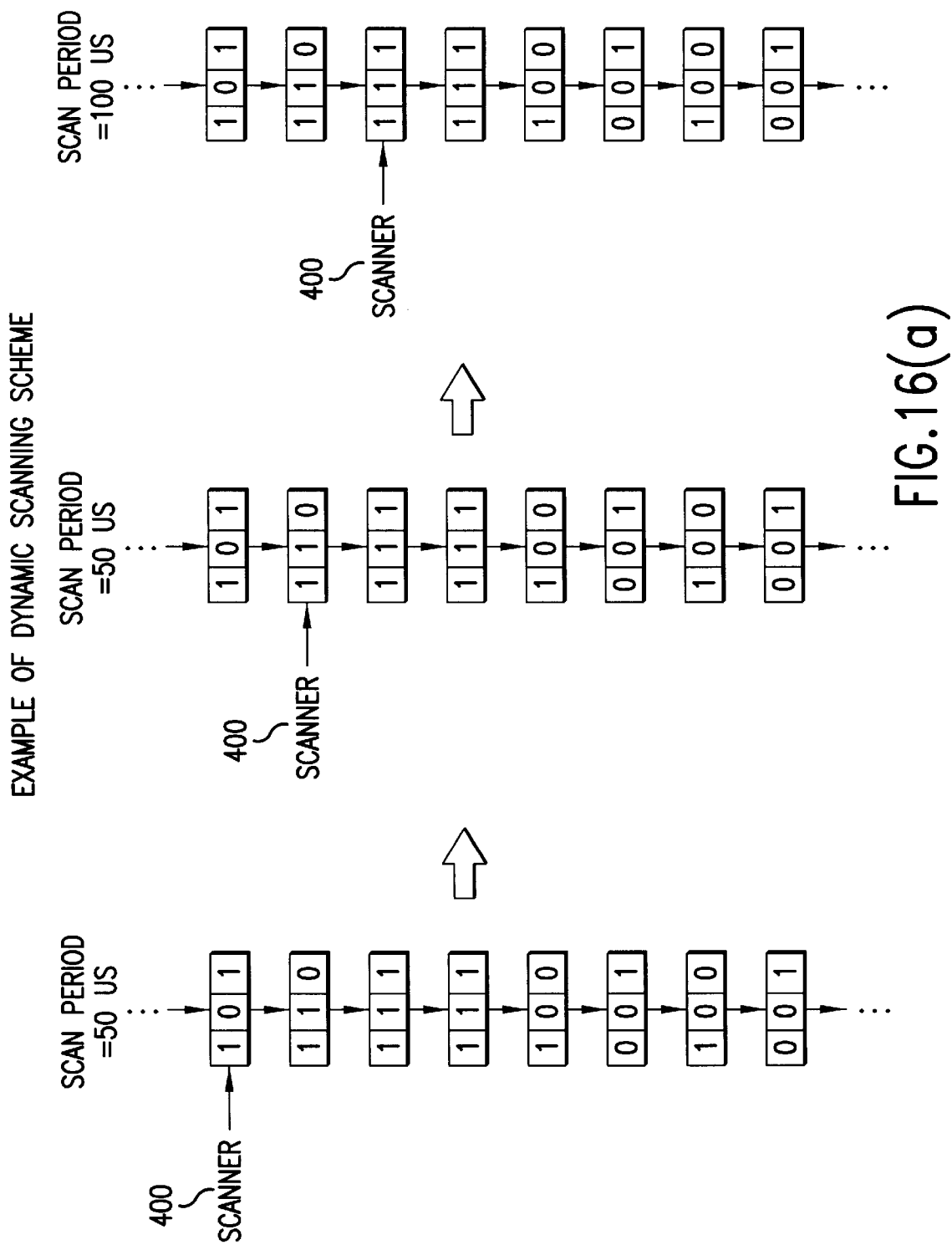

SHARED BUFFER MANAGEMENT MECHANISM AND METHOD USING MULTIPLE LINKED LISTS IN A HIGH SPEED PACKET SWITCHING SYSTEM

BACKGROUND OF THE INVENTION

1. Technical Field of the Invention

This invention generally relates to managing multi-port access to a shared memory in a packet switching system. More particularly, this invention relates to a mechanism for sharing a memory of a packet switching system using multiple linked lists. The invention also relates to a multiple linked list data structure for efficiently sharing a memory in a packet switching network.

2. Description of Related Art

Recently, internetworking technology has been developing at a rapid pace. The problems of internetworking traffic which include data transfer bottlenecks are increasing which causes a concomitant reduction in the internetworking service quality. To overcome the data transfer bottleneck, various approaches have been taken to speed up the rate of communications and to increase the speed of processing data.

One such approach is disclosed in the Heddes et al. patent (U.S. Pat. No. 5,432,908) that issued on Jul. 11, 1995. Heddes et al. disclose a buffer management technique that utilizes a buffer manager that includes a request manager, a stack manager and a first-in/first-out manager (FIFO manager).

Heddes et al. grant a buffer request by accessing a free buffer linked list stored in a buffer control record (BCR) memory. Allocated buffers are kept in different logical queues, one for each user, by adding its BCR to a FIFO linked list. The FIFO manager then manages the allocated buffers during packet receiving and transmitting.

Heddes et al. does not, however, disclose a technique for handling multicast or broadcast packets wherein a packet is transmitted from one user to a group of users (multicast) or to all other users (broadcast).

Heddes et al. also does not efficiently release or relinquish buffers which are no longer being used especially for broadcast or multicast packet buffers.

OBJECTS AND SUMMARY OF THE INVENTION

As mentioned above, there are three types of packets (unicast, multicast, and broadcast) in the network system. The system must manage the sending and receiving of these types of data between the network ports efficiently while increasing the utilization of the memory and reducing data loss. The present invention provides a method to achieve these requirements.

In the shared memory of the data switch networking system, to implement software protocol and to utilize the goals of high speed data switching, there are two primary issues that are considered by the invention:

(1) After the unicast or broadcast packet has been processed, the invention must retain the order in which it was received. In short, the packets received by port #i must be kept in the same order when they are transmitted to the port #j.

(2) When the broadcast packets are stored in the shared memory, the system is able to manage the shared memory effectively. In short, the invention configures and releases the broadcast packet buffer quickly.

It is an object of the present invention to provide a high efficiency data switch in a high-speed network system, and at the same time, keeping it economical and available.

It is another object of the present invention to efficiently manage a shared memory in a packet switching network for multicast and broadcast packets as well as unicast packets.

It is yet another object of the invention to provide a data structure for linked lists that aids in the management of a shared memory.

It is still another object of the present invention to efficiently release a buffer after use and prevent a delayed release.

It is still yet another object of the present invention to provide a dynamic method of releasing buffers in an efficient manner.

To achieve the above objects, the present invention provides a data switching network system having a shared memory for managing the transfer of packets, including a plurality of ports for receiving and transmitting packets; a shared memory subdivided into a plurality of buffers including unicast frame buffers and broadcast frame buffers; a bus interconnecting the shared memory and the plurality of ports; a linked list of free unicast packets listing each of the unicast frame buffers that are currently free; a linked list of free broadcast packets listing each of the broadcast frame buffers that are currently free; an output queue linked list for each of said plurality of ports, wherein each of the output queue linked lists includes a listing of the buffers utilized by the associated port to transmit a packet; a linked list of used broadcast packets listing all of the broadcast packet buffers currently in use; and a buffer manager connected to the shared memory and to the plurality of ports via the bus; the buffer manager accessing the linked list of free unicast packets, the linked list of free broadcast packets, the output queue linked lists and the linked list of used broadcast packets to manage unicast and broadcast packet receiving and transmitting between the plurality of ports such that the packets are kept in a FIFO order.

To further achieve these objects, the invention discloses a method of sharing a memory in a packet switching network having a plurality of ports connected to the memory via a bus, including the steps of: dividing the memory into a plurality of buffers including unicast frame buffers; requesting a buffer from a linked list of free unicast buffers; transmitting the unicast packet from a first port to a second port of the packet switching network by storing the unicast packet from the first port in the buffer requested in the requesting step, and receiving the unicast packet from the buffer requested in the requesting step with the second port; releasing the buffer utilized in the transmitting step; and updating the linked list of free unicast buffers.

To still further achieve these objects, the invention discloses a method which further includes the steps of scanning a broadcast status field in the linked list of used broadcast buffers and permitting release of the broadcast buffer if the scanned broadcast status field indicates that all ports have transmitted the broadcast packet.

To still further achieve the objects of the invention, the scanning step may scan the linked list of used broadcast buffers once every scanning period and dynamically adjust the scanning period according to present and/or past scanning results.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein:

FIGS. 16(a)–(c) illustrate an example of the dynamic scanning range procedure according to the invention.

DETAILED DESCRIPTION OF PREFERRED EMBODIMENTS

Figure 1:
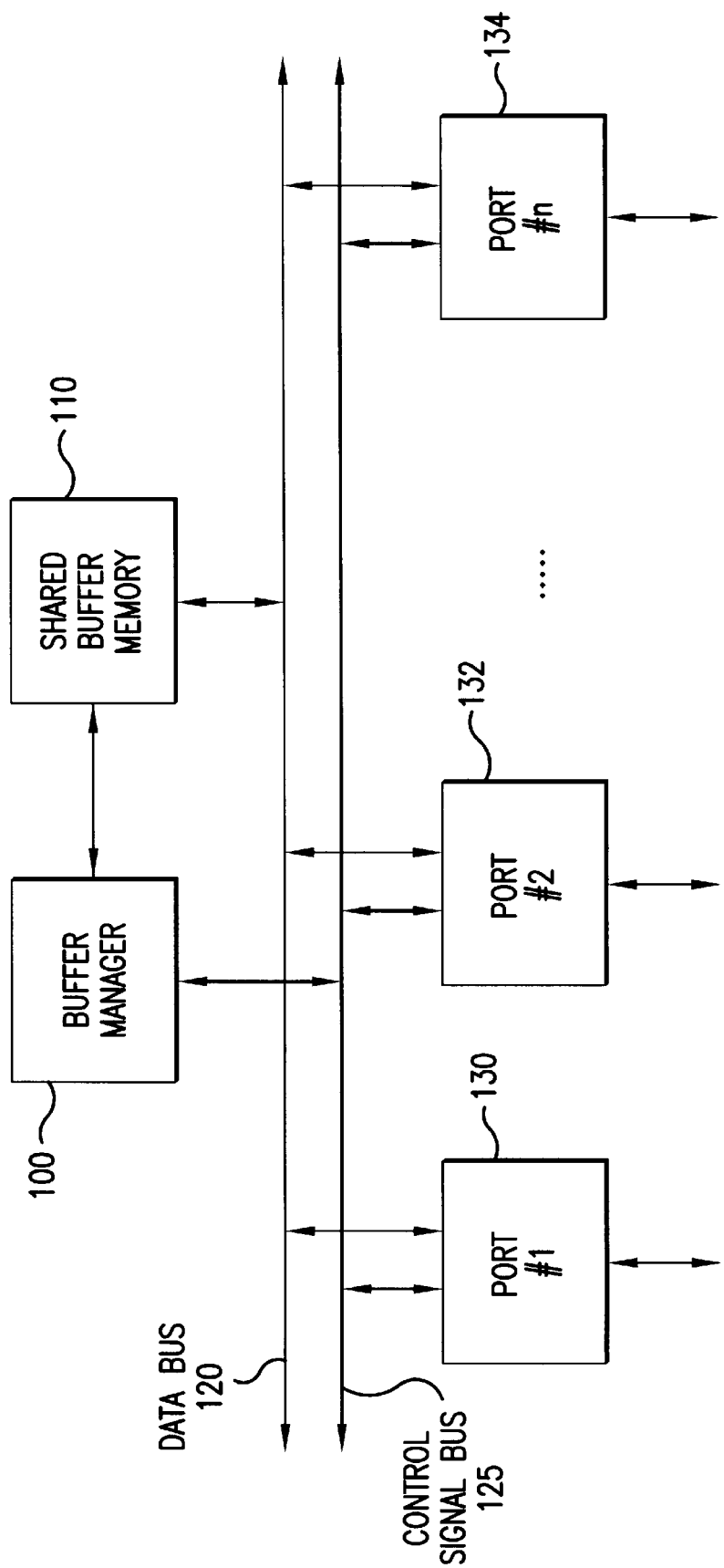
FIG. 1 is a block diagram of a shared buffer system according to the invention.

FIG. 1 illustrates a computer system including an data bus 120 interconnecting a shared buffer memory 110 and a plurality of ports 130, 132, 134 (also labelled port #1, port #2 . . . port #n). A control signal bus 125 interconnects a buffer manager 100 and the plurality of ports 130, 132, 134. The buffer manager 100 is also connected to the shared buffer memory 110.

The shared buffer memory 110 is subdivided, physically and/or virtually, into a plurality of packet buffers. As further described below, each packet buffer may store a packet containing frame data 360 and header data (305 or 355).

As known in the art, the ports 130, 132 and 134 communicate with each other and with the shared buffer memory 110 using packets which may be unicast, multicast or broadcast packets.

This detailed description primarily refers to broadcast packs to explain the elements and operations of the present invention. It should be understood that these explanations also apply to multicast packets because these two types of packets are similar.

To efficiently and effectively manage packet transfer and the shared buffer memory 110, the buffer manager 100 utilizes multiple linked lists. Before describing the operation of the present invention, the four types of linked lists used by the invention are introduced as follows:

(1) The linked list of free unicast packet buffers will be referred to as the linked list of free unicast packets. The linked list of free unicast packets keeps track of which unicast packet buffers are unused so that the system can efficiently locate and manage free unicast packet buffers.

(2) The linked list of free broadcast packet buffers will be referred to as the linked list of free broadcast packets. The linked list of free broadcast packets keeps track of which broadcast packets buffers are unused so that the system can efficiently locate and manage free broadcast packet buffers.

(3) The set of linked lists, one for each output queue, will be referred to as the linked list for output queue. When referring to an output queue for port #i, the nomenclature used will be the linked list for output queue of port #i. The linked list for output queue of port #i keeps track of each output packet sent from port #i and is used to maintain FIFO packet order.

(4) The linked list of used broadcast packet buffers will be referred to as the linked list of used broadcast packets. The linked list of used broadcast packets is used by the invention to keep track of which broadcast packet buffers are currently being used and to efficiently release or relinquish such used broadcast packet buffers when they are no longer needed.

In general, when a network port (eg. port 130) receives a packet, port 130 requests a buffer from the linked list of free unicast packets or the linked list of free broadcast packets by sending a signal to the buffer manger 100 via control signal bus 125. Once granted a free packet buffer, the port 130 then stores the packet in the designated buffer.

After the packet has been stored into the designated buffer, the buffer manager 100 adds an entry to the linked list of output queue for port 130 to refer to the designated buffer and removes the entry for the designated buffer from linked list of free unicast (or broadcast) packets.

If the packet is a broadcast packet, then the buffer manager 100 also adds an entry to the linked list of used broadcast packets 220 to refer to the designated buffer. As further described below, the linked list of used broadcast packets 220 is used to efficiently process the release of broadcast buffers.

Figure 2:
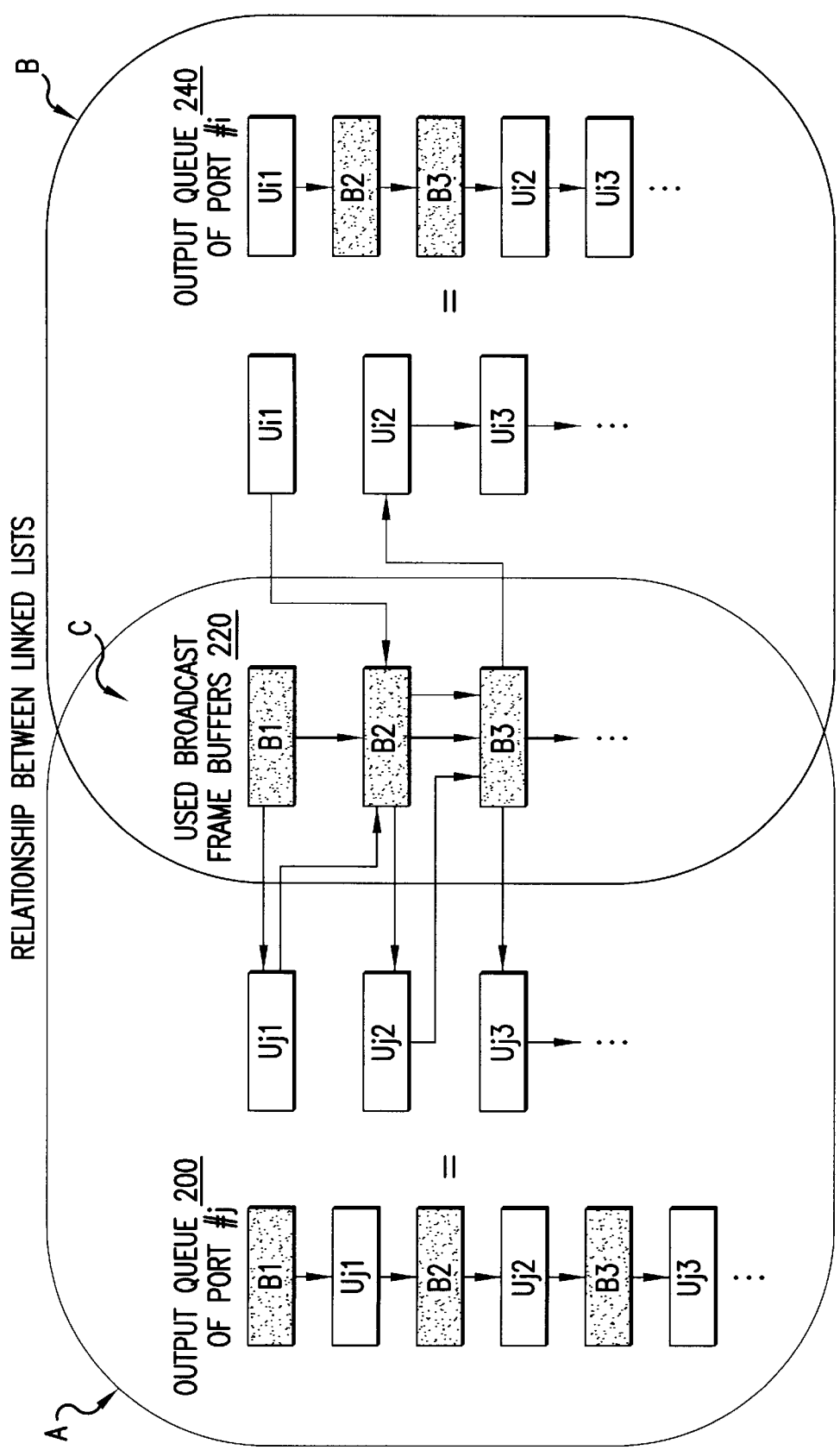
FIG. 2 is a diagram illustrating the relationship between a linked list for output queue of port #j, a linked list of used broadcast frame buffers, and a linked list for output queue of port #i according to the invention.

FIG. 2 describes the relationship between the linked list for output queue 200 and the linked list of used broadcast packets 220. More particularly, FIG. 2 describes the relationship between the linked list for output queue 200 of port #j, the linked list of used broadcast frame buffers 220, and the linked list for output queue 200 of port #i.

In FIG. 2, "B1" indicates a first broadcast frame buffer; "B2" indicates a second broadcast frame buffer; "Uj1" indicates a first unicast frame buffer for port #j; "Ui2" indicates a second unicast frame buffer for port #1, etc.

On the left side of FIG. 2, the linked list for output queue 200 of port #j includes a first broadcast frame buffer B1 which is linked to a first unicast frame buffer for port #j (Uj1) which, in turn, is linked to a second broadcast frame buffer B2 which, in turn, is linked to a second unicast frame buffer for port #j (Uj2), which, in turn, is linked to a third broadcast frame buffer B3 which, in turn, is linked to a third unicast frame buffer for port #j (Uj3), etc.

On the right side of FIG. 2, the linked list for output queue 240 of port #i includes a first unicast frame buffer for port #i (Ui1) which is linked to the second broadcast frame buffer B2 which, in turn, is linked to the third broadcast frame buffer B3 which, in turn, is linked to a second unicast frame buffer for port #i (Ui2), which, in turn, is linked to a third unicast frame buffer for port #i (Ui3), etc.

The left and right sides of FIG. 2, showing the linked list for output queue 200 of port #j and the linked list for output queue 240 of port #i, are related to the used broadcast frame buffers 220 shown in portion C of FIG. 2 (between the "=" signs). As shown, the linked list of used broadcast frame buffers 220 includes a first broadcast frame buffer B1 having a link to unicast frame buffer Uj1 which, in turn is linked to broadcast frame buffer B2.

As further shown in section C of FIG. 2, the first broadcast frame buffer B1 is also linked to the second used broadcast frame buffer B2 which, in turn, is linked to unicast frame buffer Uj2 and to the third used broadcast frame buffer B3.

Also, the unicast frame buffer Ui1 is linked to used broadcast frame buffer B2 and unicast frame buffer Uj2 is linked to broadcast frame buffer B3. In addition broadcast frame buffer B3 is linked to unicast frame buffer Ui2.

Figure 3:
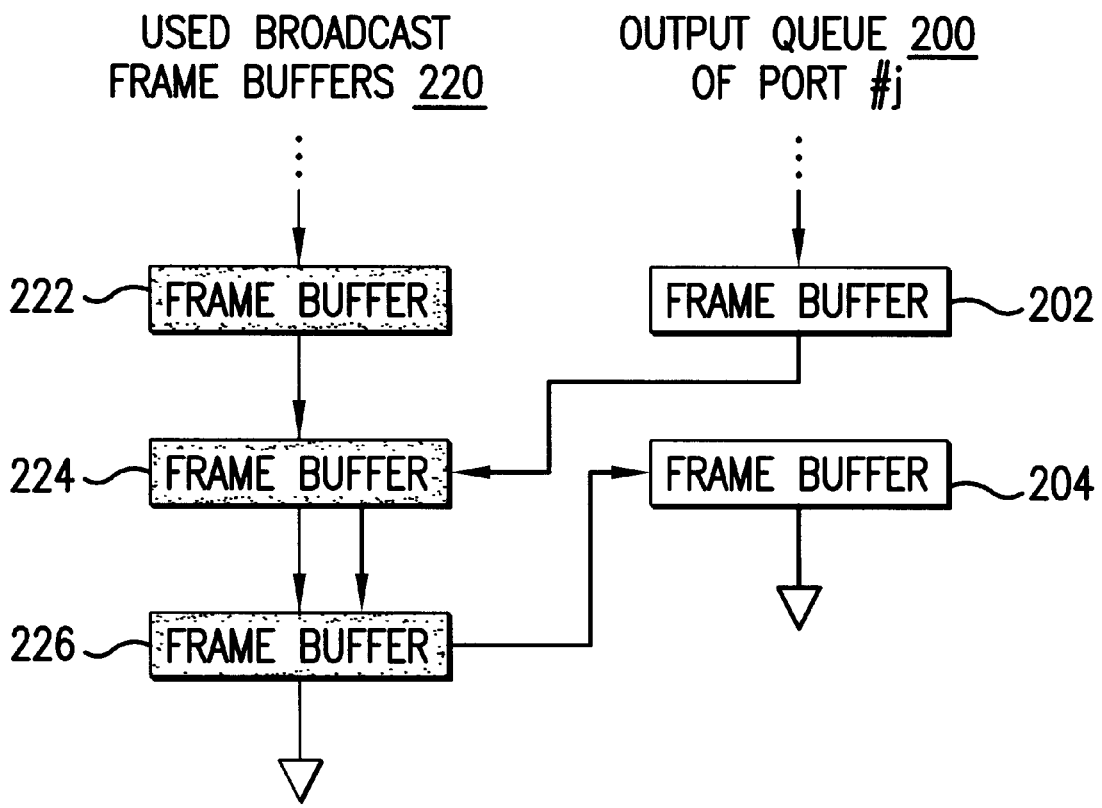
FIG. 3 is an example of port #i receiving (RX) a frame and linking to port #j including a linked list of used broadcast frame buffers and a linked list for output queue of port #j according to the invention.

FIG. 3 illustrates an example describing how to establish the relationship between the linked lists shown in FIG. 2. More particularly, FIG. 3 further describes the relationship between the linked list of used broadcast frame buffers 220 and the linked list for output queue 200 of port #j.

The linked list of used broadcast frame buffers 220 shown in FIG. 3 includes broadcast frame buffer 222 linked to broadcast frame buffer 224 which, in turn, is linked to broadcast frame buffer 226.

The linked list for output queue 200 of port #j shown in FIG. 3 includes frame buffer 202 linked to broadcast frame buffer 224 which indicates that the packet from port #j to port #i was sent via broadcast frame buffer 224. Broadcast frame buffer 226 also has a link to frame buffer 204 in the linked list of output queue 200 for port #j which is the next frame buffer of the output queue 200 of port #j.

Figure 4A:
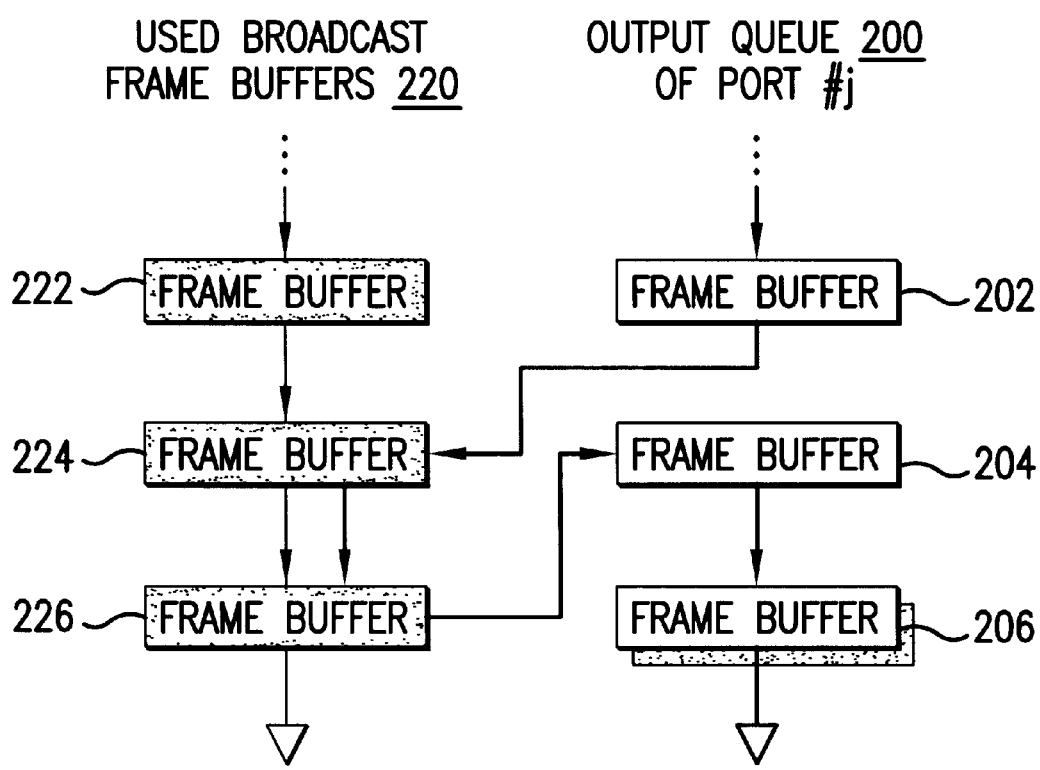
FIG. 4(a) is an example of port #i receiving (RX) a frame and linking to port #j including inserting a unicast frame buffer to the linked list for output queue of port #j and illustrating the associated linked list of used broadcast frame buffers according to the invention.
Figure 4B:
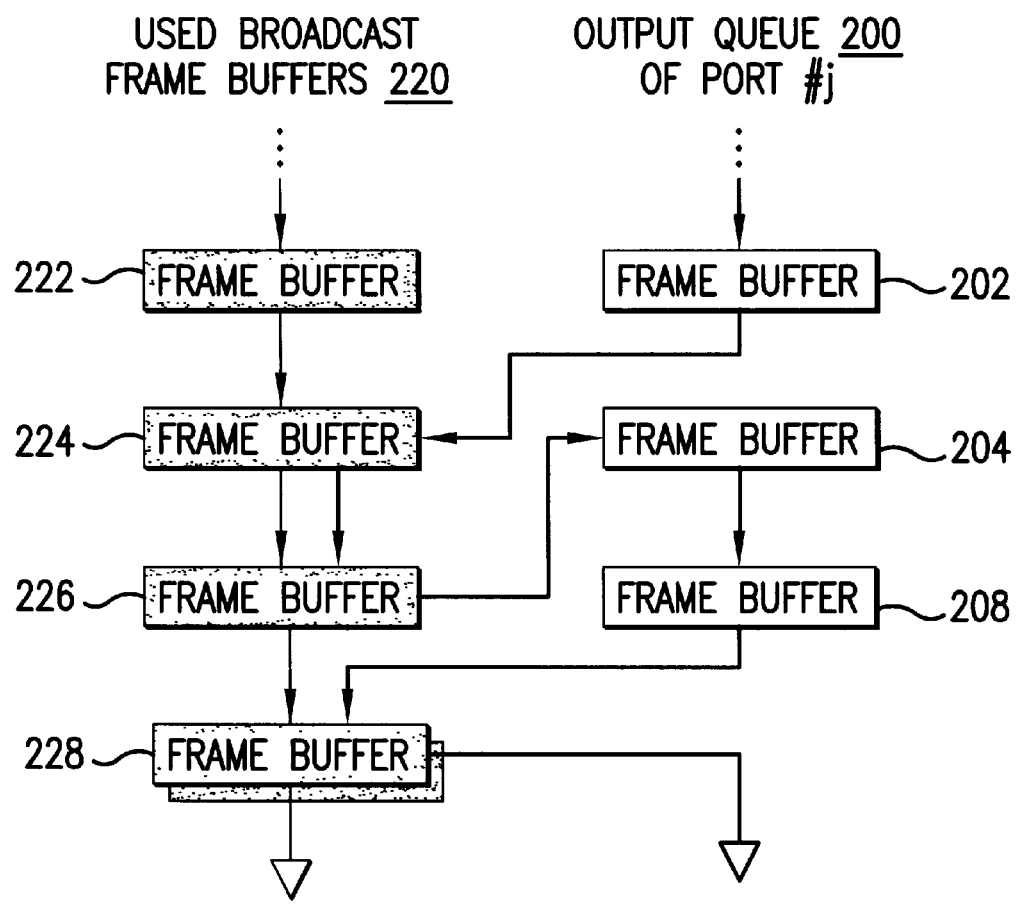
FIG. 4(b) is an example of port #i receiving (RX) a frame and linking to port #j including inserting a broadcast frame buffer to the linked list for output queue of port #j and illustrating the associated linked list of used broadcast frame buffers according to the invention.

In FIG. 4, suppose that when port #i receives a unicast packet, it then requests a buffer from the linked list of free unicast packets to store the received packet. At the same time, port #i determines the destination port for the unicast packet (suppose port #j). Then, the packet requires entrance to the destination port #j.

FIG. 4(*a*) illustrates inserting a unicast frame buffer to the linked list for output queue for port #j. More particularly, FIG. 4(*a*) illustrates inserting unicast frame buffer 206 into the linked list for output queue 200 of port #j (the destination port) including a link from frame buffer 204.

According to the same principle illustrated in FIG. 4(*a*), if port #k receives a broadcast packet, then it requests a buffer from the linked list of free broadcast packets for storage. Then, the broadcast packet requires entrance to the destination port and the linked list of used broadcast packets 220.

FIG. 4(*b*) illustrates inserting a broadcast frame buffer after port #i receives a broadcast packet. More particularly, FIG. 4(*b*) illustrates inserting broadcast frame buffer 228 into the linked list of used broadcast frame buffers 220, adding frame buffer 208 to the linked list for output queue 200 of port #j, and creating a link from frame buffer 208 of the linked list for output queue 200 of port #j (the destination port) to broadcast frame buffer 228.

The major difference between the process illustrated in FIG. 4(*b*) for inserting a broadcast frame buffer into the linked list of used broadcast frame buffers 220 and inserting the buffer for unicast packets in FIG. 4(*a*) is that the invention not only puts the buffer into linked list for output queue 200, but also puts the buffer into the linked list of used broadcast packets 220.

Buffer Release Mechanism and Procedure

The present invention includes unique and efficient strategies for releasing or relinquishing used unicast and broadcast frame buffers. These strategies release portions of the shared memory by processing the packets with a series of linked lists.

Figure 5:
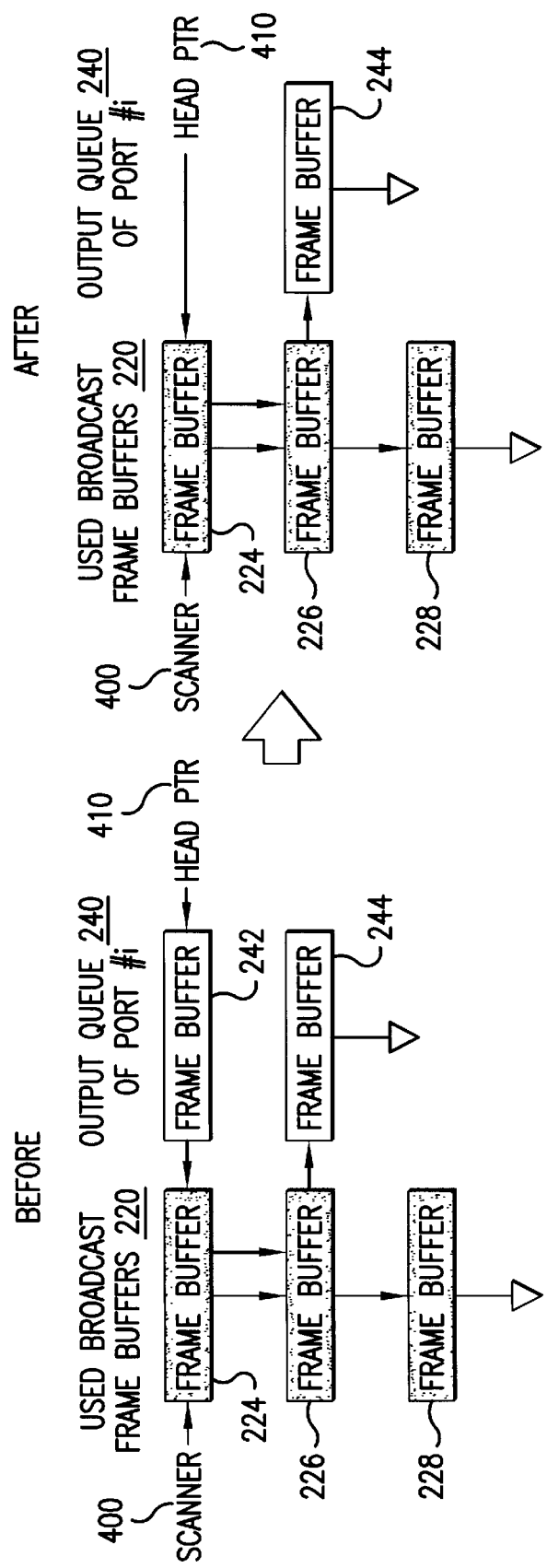
FIG. 5 is an example of port #i transmitting (TX) a unicast frame and including a before and after illustration of the linked list of used broadcast frame buffers and the linked list for output queue of port #i before and after a unicast frame buffer is released according to the invention.

The simplest release mechanism is for releasing unicast packet buffers. After the first packet (unicast) in the linked list for output packets has been transmitted successfully, the invention releases the buffer immediately and puts an indication of the released buffer into the linked list of free unicast packets, as shown in FIG. 5. Then, continue to transmit the next packets (broadcast).

More particularly, FIG. 5 includes a before and after illustration of the inventive linked lists before an after the release of a unicast frame buffer. In the "before" illustration, the head pointer (ptr) 410 points to the beginning address of frame buffer 242. In other words, the head pointer 410 is used to point to the first frame buffer of output queue 200 of port #i. Immediately after transmission of unicast frame buffer, and as shown in the "after" illustration, the unicast frame buffer 242 is released by moving the head pointer 410 to frame buffer 224.

The broadcast buffers must be released after all of the packets in all of the ports have been transmitted. To keep track of this information, the invention utilizes a broadcast status (BS) in the linked list data structure. The BS is used to indicate which ports have finished transmitting the packet and has a word length equal to the number of ports 130, 132, 134 in the system. If there are a large number of ports, then multiple words can be used for BS.

In general, the invention sets a bit in the BS to a designated value (eg. one) after the corresponding port has finished transmitting the packet. When all of the bits of BS have been set to the designated value, then the system is finished transmitting the packet to all of the ports 130, 132, 134.

Although the broadcast buffers have been moved out from each linked list for output queue, the broadcast buffers still stay in the linked list of used broadcast packets for a while until they are identifies by the inventive scanning process.

Figure 6:
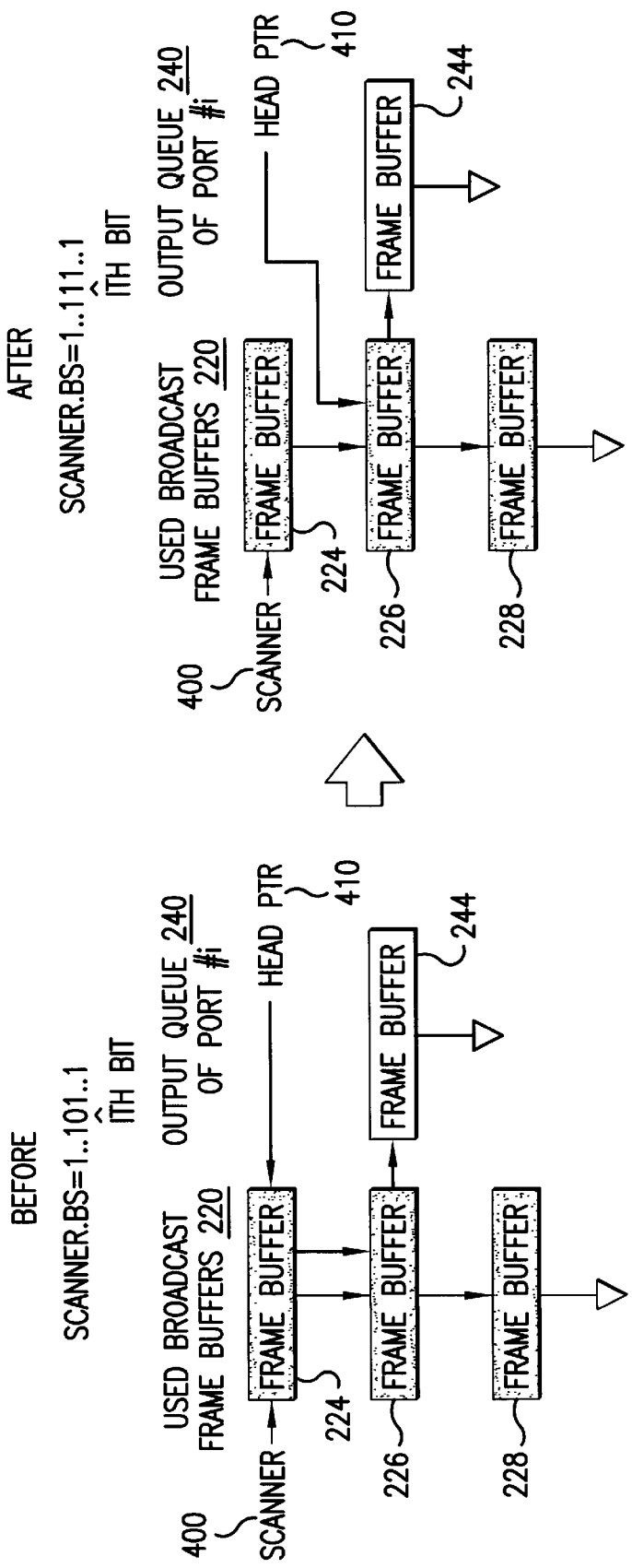
FIG. 6 is an example of the invention illustrating port #i transmitting (TX) a broadcast frame and including a before and after illustration of the linked list of used broadcast frame buffers and the linked list for output queue of port #i before and after the broadcast frame buffer is released.
Figure 7:
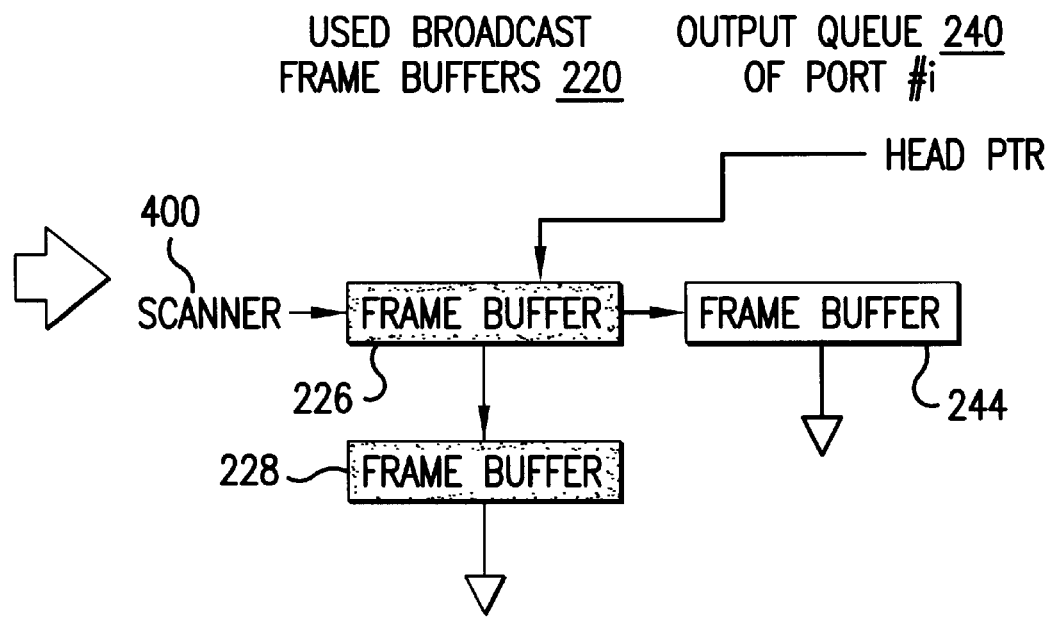
FIG. 7 is continuation of the example shown in FIG. 6 after the broadcast frame buffer is released according to the invention.

FIG. 6 and FIG. 7 illustrate releasing a broadcast frame buffer according to the invention. More particularly, FIG. 6 shows a before and after illustration before and after the broadcast buffer is released.

As diagrammatically shown in FIG. 6, the invention utilizes scanner 400 of buffer manager 100 to scan the broadcast status associated with each broadcast frame buffer (scanner.bs). The i-th bit position of scanner.bs indicates whether the i-th port has transmitted the associated broadcast packet. In the "before" illustration of FIG. 6, the i-th port has not yet finished transmitting broadcast frame buffer 224 as indicated by the "0" stored in the i-th bit position of scanner.bs.

After transmitting, the scanner 400 again checks the scanner.bs field of frame buffer 224. Because the i-th port was the last of the ports 130, 132, 134 to transmit the broadcast frame buffer, when port #i completes the transmission and updates the i-th position of scanner.bs accordingly then the broadcast frame buffer 224 can be released from the linked list of used broadcast frame buffers 220.

This completion is identified by scanner 400 in the "after" illustration of FIG. 6 which shows the i-th position of scanner.bs updated to "1" as scanned by scanner 400. The release of broadcast frame buffer 224 is accomplished by updating the head pointer 410 to point to the address of the next frame buffer (buffer 226) in the linked list of used broadcast frame buffers 220.

FIG. 7 shows the final step of releasing the broadcast frame buffer which includes updating the scanner 400 so as to point to the next frame buffer (buffer 226) in the linked list of used broadcast frame buffers 220.

If the BS receives the message that all output ports have transmitted the data stored in the buffers to the network, then release the buffer. Otherwise, the scanner 400 will point to the next frame buffer. So, in FIG. 5, when a used unicast frame buffer (that is pointed by head pointer) is transmitted to the network, then, the head pointer points to the next frame buffer. When the output queue #i transmits the frame buffer (that is pointed by head pointer) to the network, the output queue #i will set the BS of the broadcast frame buffer 224 to 1 (as shown in FIG. 6). After that, the scanner 400 will check the BS from time to time, if all the relative BSs of the output ports are set to 1, then, release the frame buffer, otherwise, the scanner will point to the next used broadcast frame buffer (as shown in FIG. 7).

In short, the present invention uses a centralized scheme controlled by buffer manager 100 to release the buffers no longer used by broadcast packets. Hence, the invention reduces the complexity of the system and reduces the size of the circuits used to implement the invention.

In rare cases, there are few buffers that are not in use and cannot be used by the ports 130, 132, 134. As long as the implementation supplies enough buffers and controls the scan range properly, the problem can be reduced to a minimum.

According to the description in the previous sections, when the packets (broadcast or multicast) have been received, as long as the initial broadcast status is set properly, the method provided by the present invention can release the buffers. In other words, when processing the broadcast packets, as long as the initial broadcast status that corresponds to the receiving ports is one, the rest should be zero.

When processing multicast packets, the invention sets the initial broadcast status corresponding to the ports that are not transmittable (or otherwise not included in the group of ports being sent the multicast packet) to one. After that, the operations will be the same as broadcast packet transfer and subsequent buffer release.

Data Format of Linked Lists

Figure 8:
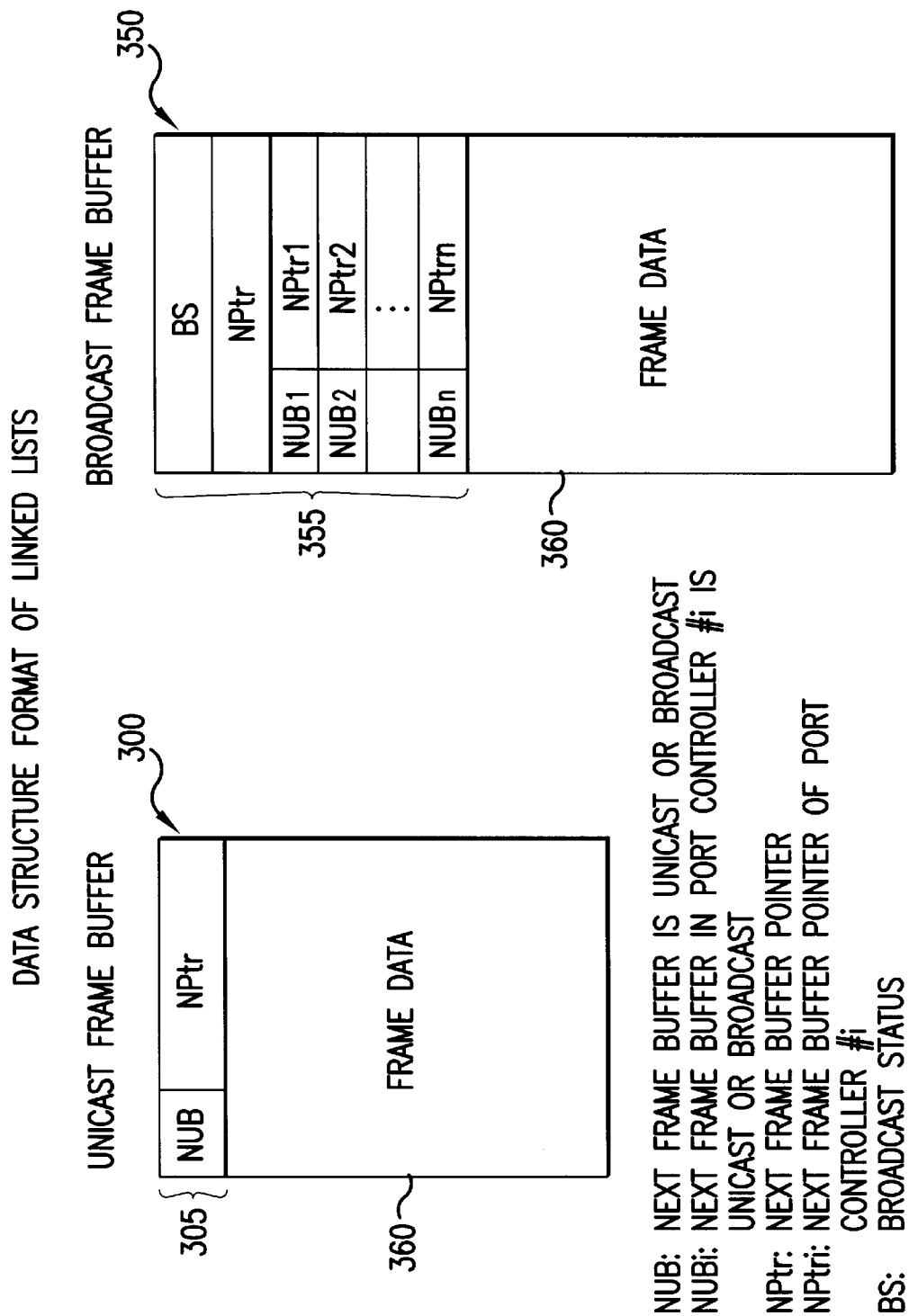
FIG. 8 is a data structure format of linked lists for unicast frame buffers and broadcast frame buffers according to the invention.

As mentioned above, the invention utilizes a series of linked lists to manage packet transfer and buffer release. FIG. 8 illustrates the preferred data format of linked lists according to the invention.

More particularly, FIG. 8 shows the data structure format of linked lists for unicast and broadcast frame buffers. The data structure format 300 of linked lists for unicast buffers includes a header data field 305 and a frame data field 360. The header data field includes an NUB field that is a binary indication of whether the next frame buffer in the linked list is a unicast or broadcast and an NPtr field that is a pointer to the next frame buffer in the linked list.

The data structure format 350 of linked lists for broadcast frame buffers 350, as shown in FIG. 8, includes a header data field 355 and a frame data field 360. The header data field 355 includes a BS (broadcast status) field, an NPtr field that is a pointer to the next frame buffer in the linked list, and n additional fields where n is equal to the number of ports 130, 132, 134. The n additional fields each have an NUBi subfield that is a binary indication of whether the next frame buffer in port #i is unicast or broadcast and an NPtri field that is a pointer to the next frame buffer of port #i in the linked list.

Figure 9:
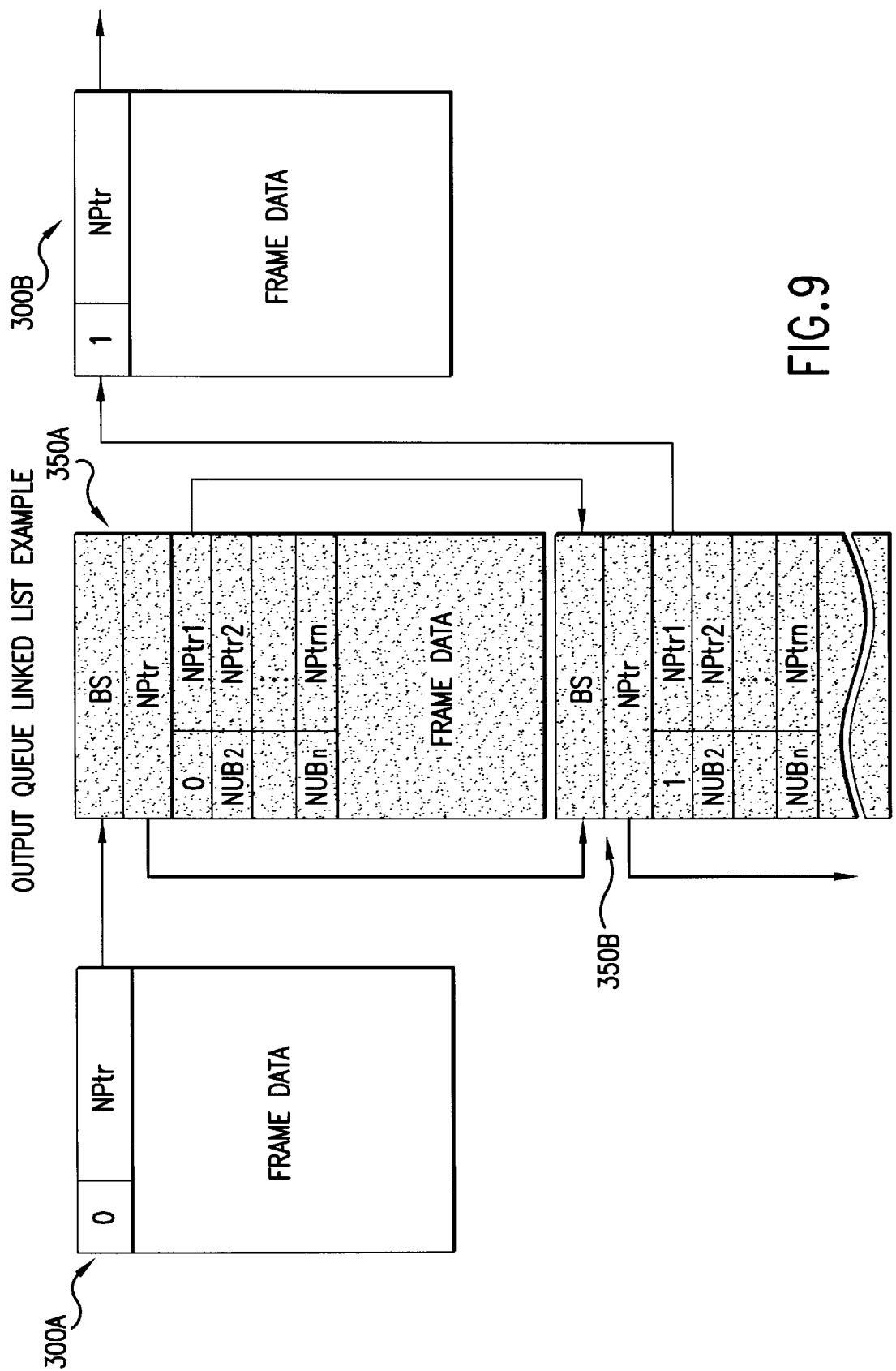
FIG. 9 is an example of a data structure format of linked lists including unicast and broadcast frame buffers entries according to the invention.

FIG. 9 illustrates an example of a linked list for output queue that utilizes the data structure of FIG. 8. Because the NUB of the first buffer 300A is zero, the next buffer 350A in the linked list is for storing broadcast packets. The location of the next buffer 350A is stored in the NPtr field of the first buffer 300A.

As further shown for the second buffer 350A in the linked list, for the port #1, NUB1 is zero, so that the next buffer 350B in the linked list for output queue is a broadcast buffer. The address of the next buffer 350B is stored in the NPtr1 associated with NUB1 as indicated by the link connecting NPtrl and the next buffer 350B The NUB1 for the next buffer 350B is one, which indicates that the following buffer 300B is for storing a unicast packet and so on.

Figure 10:
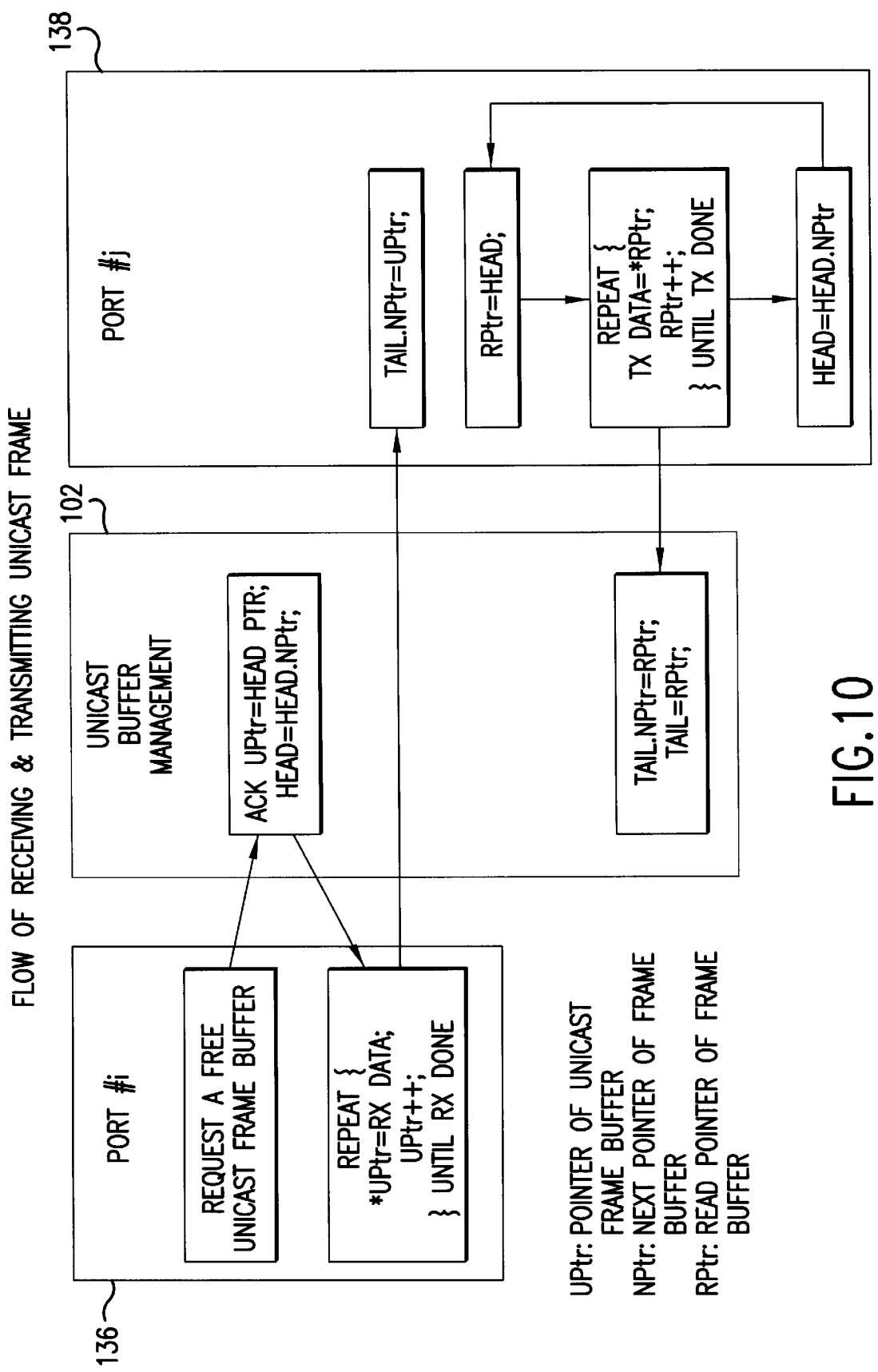
FIG. 10 is a high-level flowchart describing the receiving and transmitting of a unicast frame according to the invention.
Figure 11:
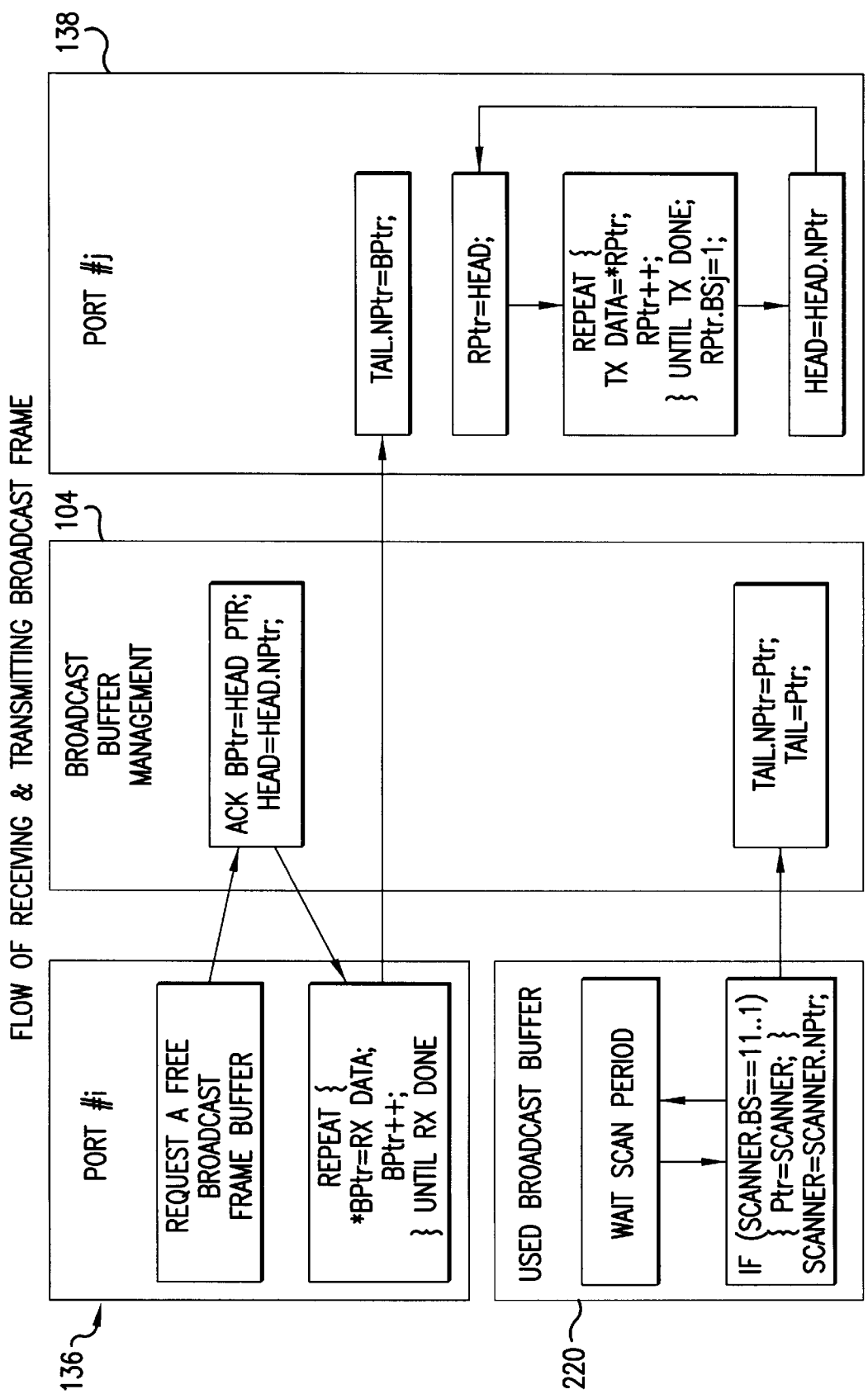
FIG. 11 is a high-level flowchart describing the receiving and transmitting of a broadcast frame according to the invention.

In summary, FIG. 10 and FIG. 11 are used to describe how the received packets in the system are transmitted to the destination port. FIG. 10 shows the operational flowchart for the unicast packet in the system and FIG. 11 shows the operational flowchart for the broadcast packet in the system.

As shown in FIG. 10, the typical transmission of a unicast packet begins with a request for a free unicast frame buffer from port #i. The unicast buffer management section 102 of buffer manager 100 acknowledges the request and sets UPtr (pointer of unicast frame buffer) to the head pointer and head=head.NPtr.

The following identifies the variables utilized in FIGS. 10 and 11.

head: head pointer of linked list
tail: tail pointer of linked list
head NPtr: next buffer pointer of head
tail NPtr: next buffer pointer of tail In FIGS. 10 and 11, if port #i (136) didn't receive the frame, port #i will request the unicast buffer manager (102) and broadcast buffer manager (104) to give the frame buffer individually.

As illustrated in FIG. 10, when port #i (136) receives unicast data, use UPtr to write the receiving data to frame buffer sequentially. Then, give this pointer of the frame buffer to the destination port #j (138). The output queue #j (138) will link this pointer to the tail of the output queue port #j (138) and will read the data from the frame buffer pointed by head pointer. When the transmission is done, if the frame buffer pointed by head pointer is a unicast frame buffer, port #j (138) will give this pointer to unicast buffer management (102) and then link it to tail of "free unicast frame buffer." That is, to release unicast frame buffer to unicast buffer manager (102). This is shown in FIG. 10.

Whereas, the frame buffer, port #j (138) will let RPtr.BSj=1 (RPtr.BSj is the BS of the frame buffer pointed by RPtr). The used broadcast buffer (220) will check the BS of broadcast frame buffer periodically. If BS is all ones, used broadcast buffer (220) will give this pointer to broadcast buffer management 104 and release it. Then, the scanner 400 will point to the next used broadcast frame buffer. This is shown in FIG. 11.

Figure 12:
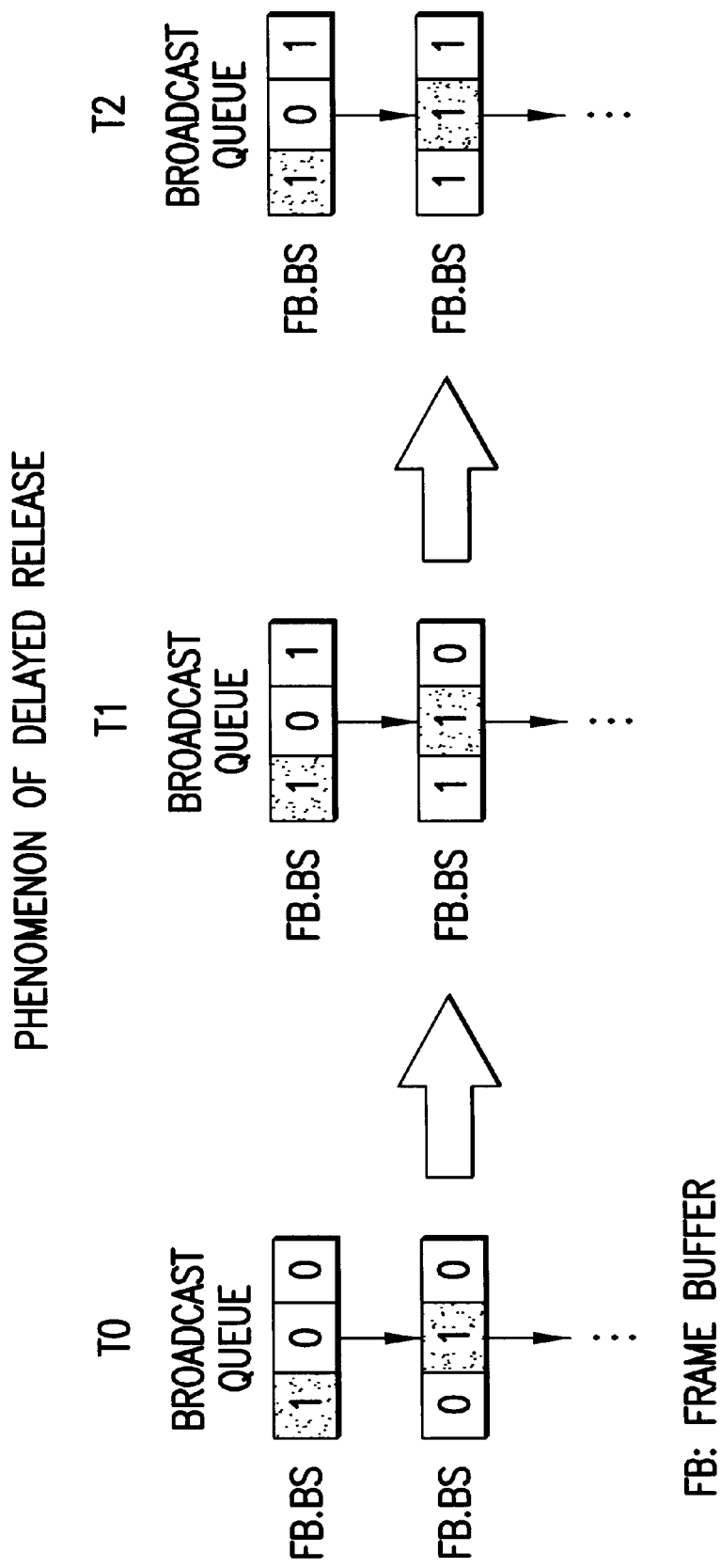
FIG. 12 illustrates the phenomenon of delayed release of a broadcast frame buffer using a time-sequence of three drawings.

There is a problem that needs to be solved when receiving and transmitting broadcast packets. FIG. 12 describes the problem. To better understand the problem, suppose there are three ports in the system as indicated by the three bit positions in the broadcast status for the frame buffer (FB.BS). At the time of T0, port #1 and port #2 receive the packets individually and the broadcast status (FB.BS) is shown in the left part of the figure for each packet.

At the time T1, port #3 sends the first broadcast packet, and port #1 sends the second broadcast packet. The broadcast status for each of the broadcast packets is set to one, as shown in the middle of FIG. 12 under T1.

Then at the time T2, suppose that port #2 is busy, therefore, the first packet cannot be transmitted. Port #3, however, is not busy and transmits the second packet successfully as shown in the right of FIG. 12 under T2. Then, the buffer used by the second packet can be released.

However, if the scanner 400 only checks the broadcast status for the first packet in the linked list of used broadcast buffers, the disadvantageous situation as shown in FIG. 12 occurs. The buffer for the second packet which has been successfully transmitted by all ports (FB.BS=111) should be released, but it is not. This failure to release a broadcast buffer reduces the utilization of the shared memory 110.

In order to overcome this problem, the present invention uses a scanning method to scan the broadcast status for each packet to determine if it is necessary to release the associated buffer or not.

Figure 13:
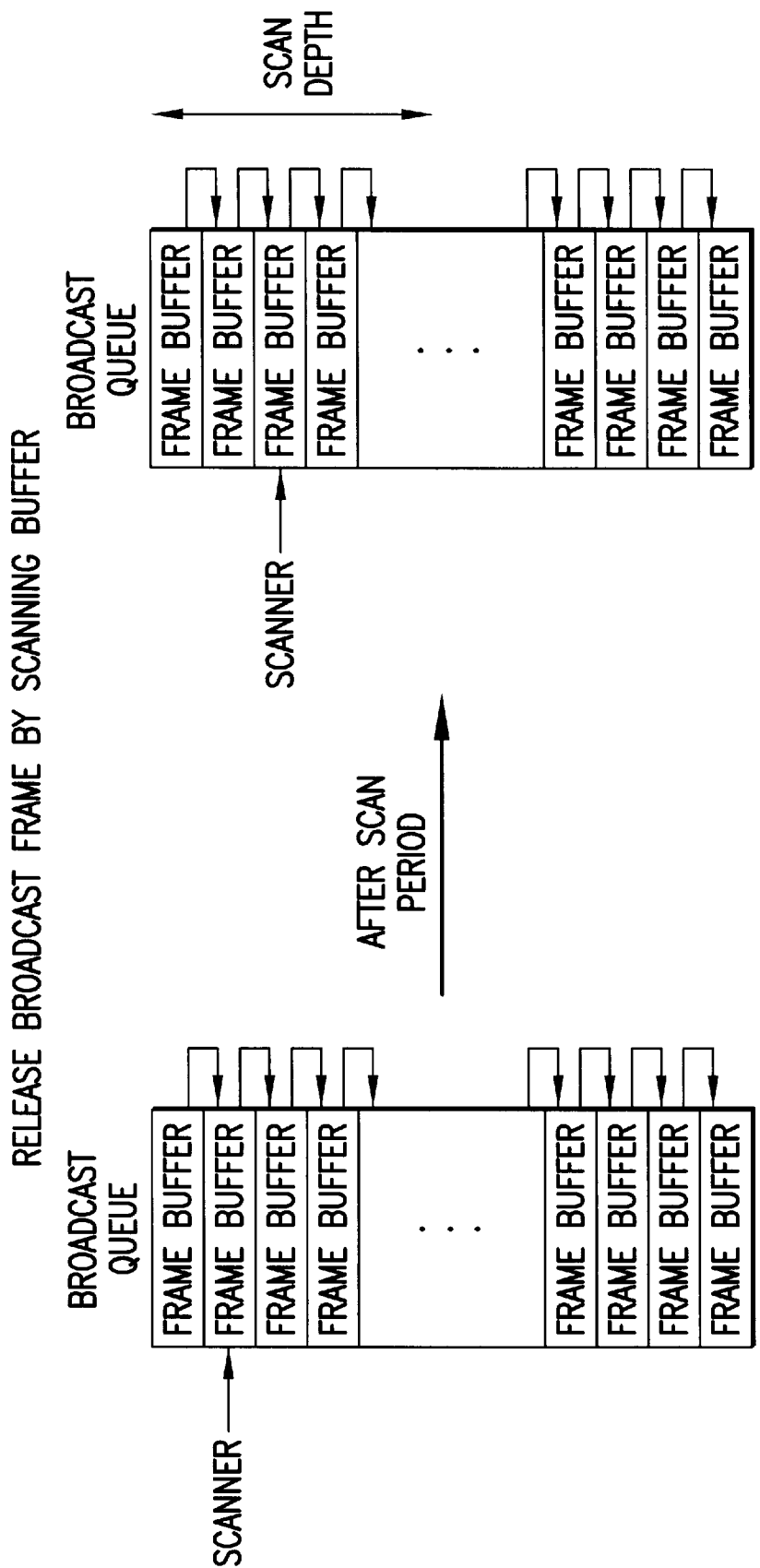
FIG. 13 illustrates the release of a broadcast frame buffer by scanning the buffer according to the invention.

As shown in FIG. 13, the scanning method utilizes a scan range for scanner 400 which is from the beginning of the linked list to a given depth within the list. Then, it returns, as shows in FIGS. 13 and 14. The reason the scanning method proceeds in this fashion is that most of packets that are received early will be transmitted first. Thus, the invention only scans the part in the front of the list to find the buffers ready for release and then releases that buffer.

Figure 14:
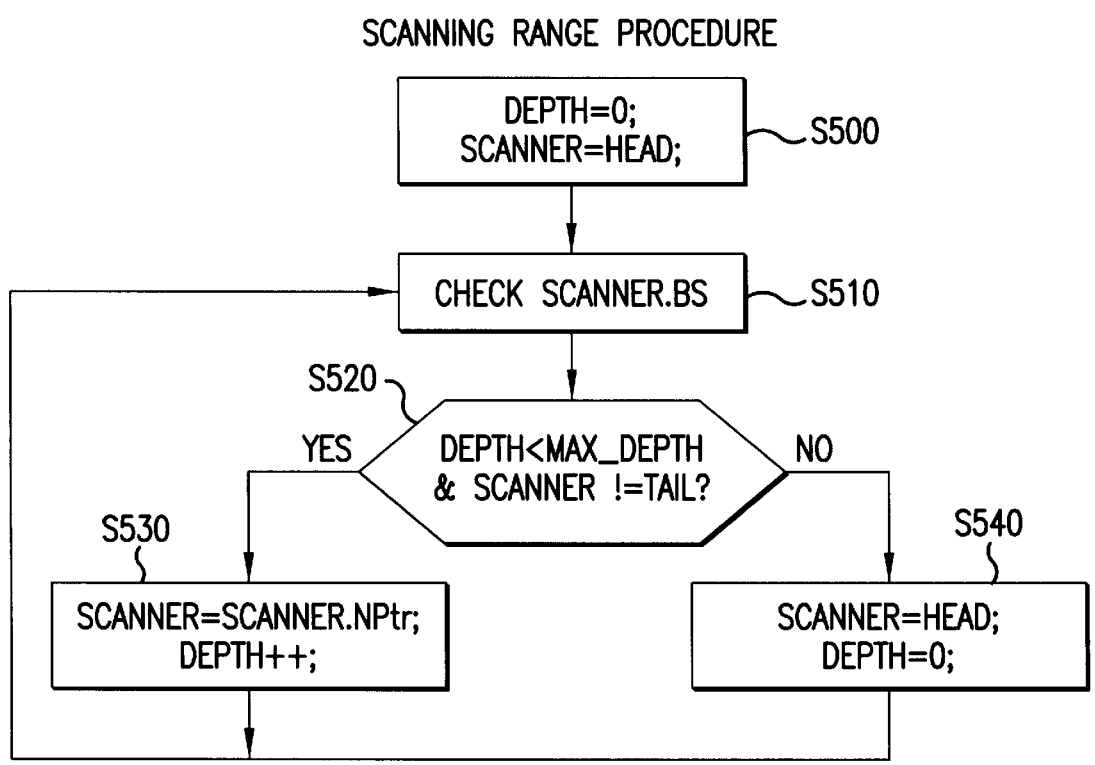
FIG. 14 is a high-level flowchart illustrating the scanning range procedure according to the invention.

FIG. 14 utilizes the following variables to describe the scanning range procedure:

max_depth: maximum scanning depth. That is, in the "used broadcast frame buffer" linked list. The scanning range is from head pointer to max_depth.

In Step S520, the symbol != should be interpreted as ≠

Scanner NPtr: the next frame buffer pointer of the scanner.

Because of the phenomenon of delayed release shown in FIG. 12, the invention utilizes the scanning range procedure shown in FIG. 14 to solve this problem. Whereas, if all the frame buffers are scanned, it is not efficient in memory bandwidth. Therefore, the invention scans a range of the "used broadcast frame buffer" from the head pointer the max_depth. When the scanner reaches max_depth or tail pointer, the scanner will return to head pointer. FIG. 14 further illustrates an exemplary method for this process.

More particularly, the scanning range procedure illustrated in FIG. 14 begins with Step S500 wherein the scanning depth is set to zero and the variable scanner is set to the head of the linked list. Then, step S510 scans the broadcast status as indicated by check scanner.BS. Thereafter, decision step S520 checks whether the depth is less than the maximum depth and whether the scanner is not equal to the tail address of the linked list. If yes, step S530 updates the variable scanner so as to permit scanning of the next entry in the list and also increases the depth of the scan. If the answer to decision step 520 is no, then step S540 is performed which resets the variable scanner back to the head address of the list and which resets the scanning depth to zero. After either steps 530 or 540, then the method loops back to step S510 which is described above.

Dynamic Scan of Broadcast Status

Although the scanning procedure shown in FIG. 13 and 14 is simple and easy to implement, it consumes valuable bandwidth for accessing the shared memory 110. In other words, each access to shared memory 110 to scan the broadcast status consumes valuable bandwidth.

Therefore, the invention also seeks to reduce the number of unnecessary scans as much as possible. To accomplish this goal, the present invention provides a dynamic scanning procedure as shown in FIG. 15.

In short, the dynamic scanning procedure dynamically adjusts the scan period according to the following rules: (1) when the dynamic scanning procedure does not find a buffer to release after scanning twice, it doubles the scan period and (2) when a buffer is found which is ready to release, the scan period is halved. By using a dynamic scanning procedure, the invention increases the bandwidth utilization of the memory.

Figure 15:
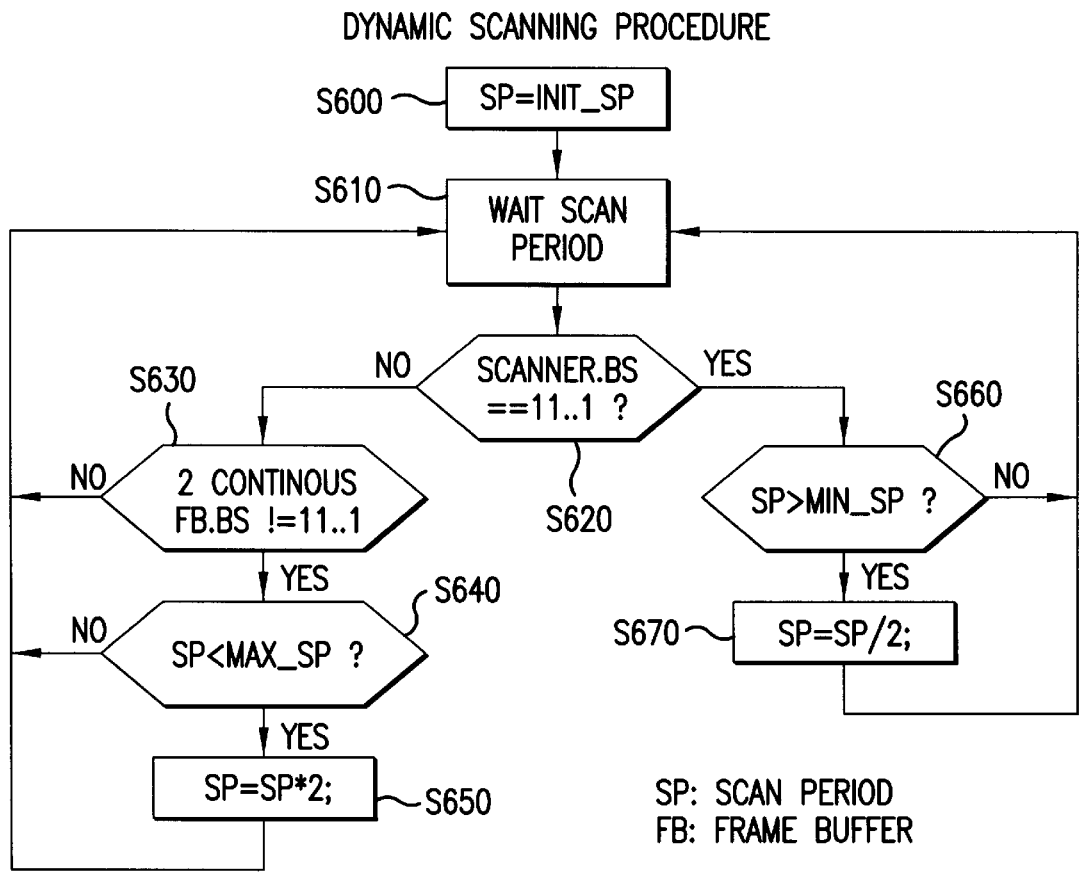
FIG. 15 is a high-level flowchart illustrating the dynamic scanning range procedure according to the invention.

FIG. 15 illustrates an implementation of the dynamic scanning procedure using a flow chart and pseudo code. In step S600, the scanning period (sp) is set to an initial scan period (init_sp).

Step S610, follows step S600 and waits for the scanning period before proceeding to step S620.

Step S620 tests whether the next buffer in the linked list of used broadcast buffers 220 is ready to be released by examining the broadcast status (scanner.BS ==11 . . . 1?). If yes, then step S660 is performed. If no, then step S630 is performed.

Step S630 checks whether the last two scans have not resulted in a buffer release (2 continuous FB.BS !==11 . . . 1?). If no, then the procedure loops back to step S610 to wait another scan period. If yes, then step S640 checks whether the scanning period is within an acceptable limit or maximum scanning period (sp<max_sp?) before doubling the scanning period in step S650. If the scanning period is within the maximum scanning period, then step S650 doubles the scanning period. Then, the method loops back to step S610 to wait another scan period.

Following a yes from step S620 (current buffer being released), step S660 checks whether the scanning period is within an acceptable limit or minimum scanning period (sp>min_sp?). If yes, then the scanning period is halved (sp=sp/2). If no, then the method loops back to step S610 to wait another scan period.

These values of init_sp, max_sp, min_sp are different for different networks. By properly setting the values of these variables, better utilization of the memory bandwidth can be achieved. For example, if a 10M Ethernet is used, then unit_sp should be about 50 µs (this is the shortest packet transmitting in the network); max_sp=200 µs, and min_sp=12.5 µs. If a different network is utilized, then one of ordinary-skill could optimize the values of these variable after routine experimentation.

Figure 16B:
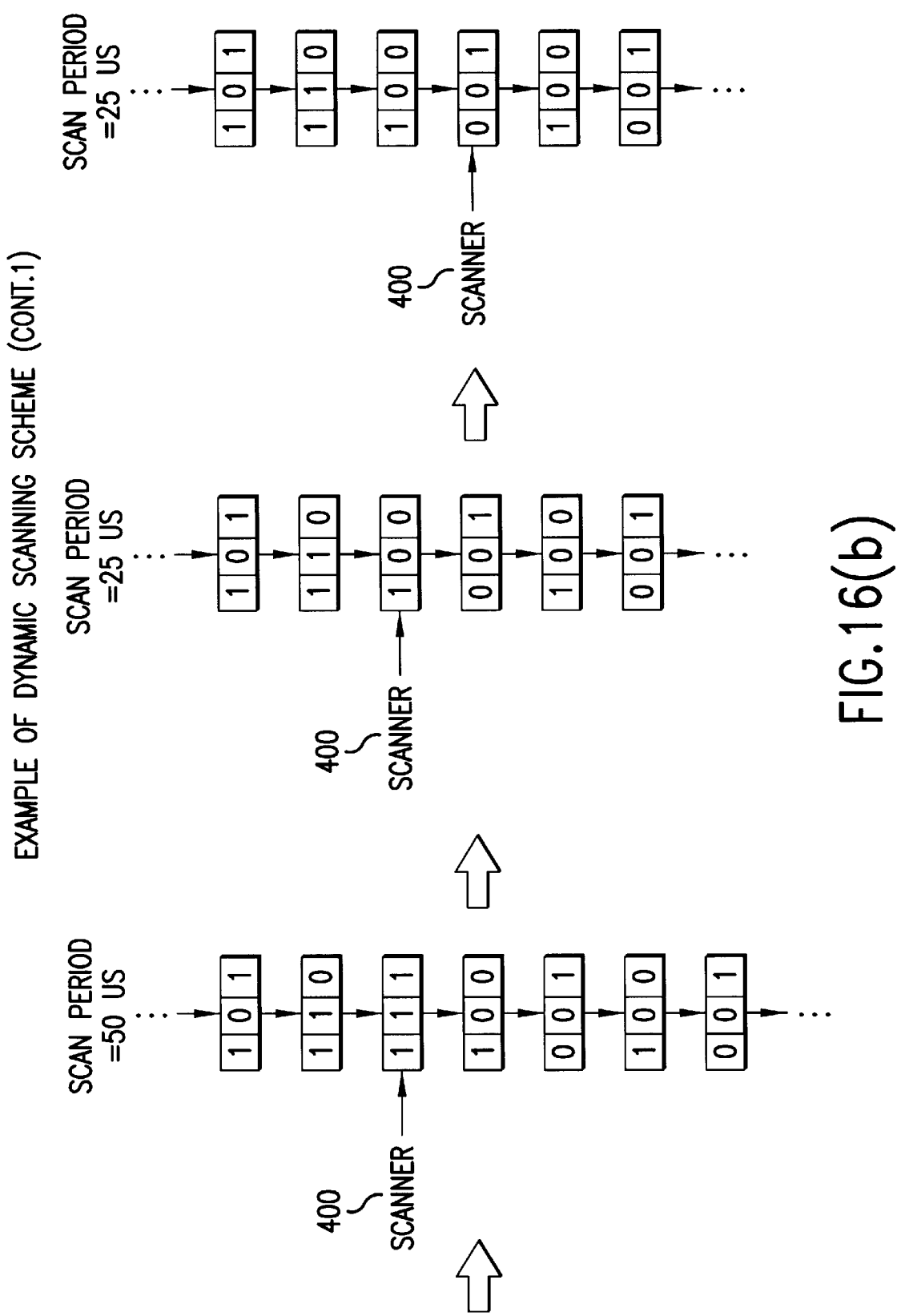
Figure 16C:
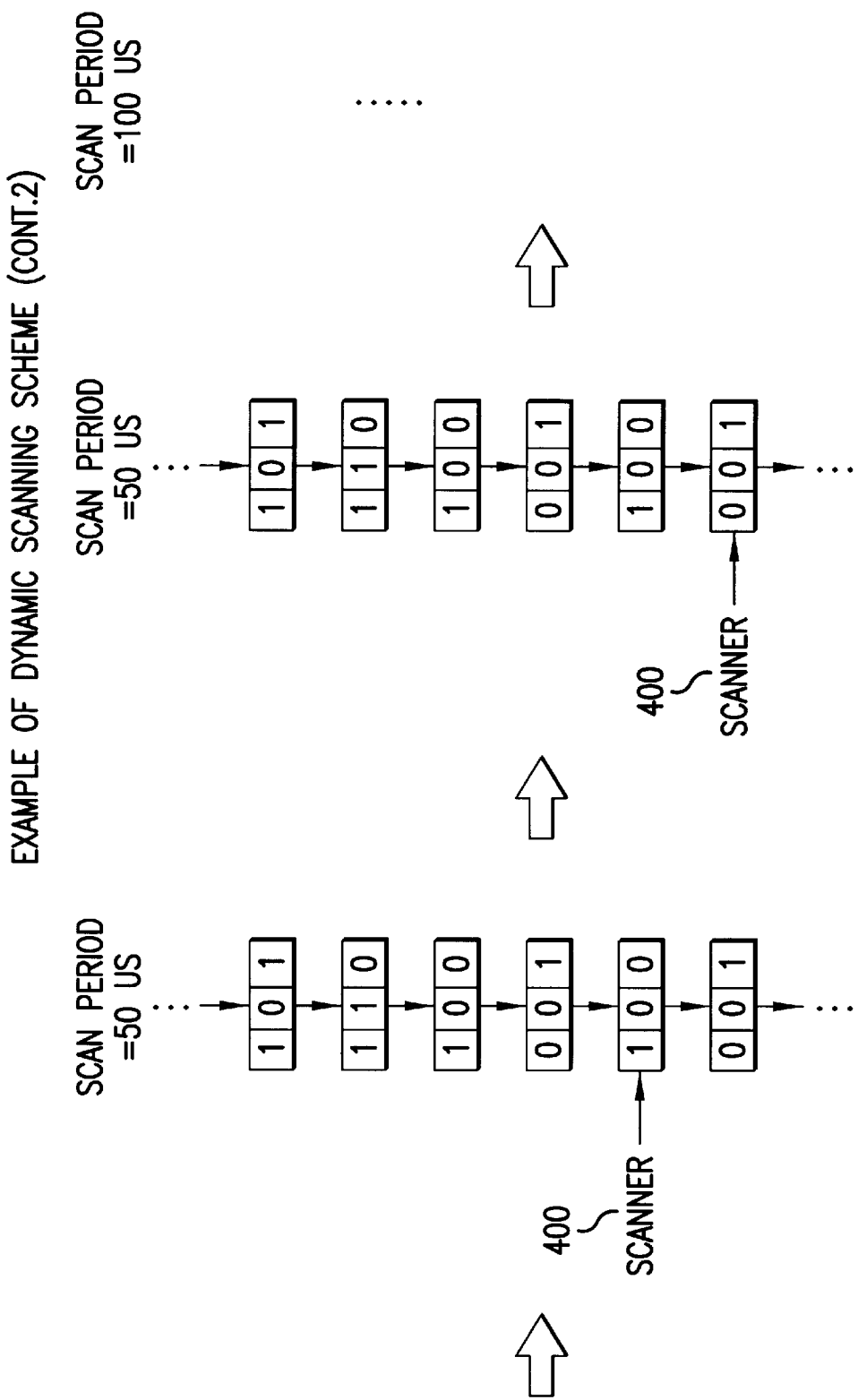

FIGS. 16(a)–(c) illustrate an example of the dynamic scanning procedure showing changes to the scan period.

The series of illustrations in FIG. 16(a) begins with an initial exemplary scanning period of 50 µs. After two scans with no buffer release, the scanning period is doubled (100 µs). The third scan discovers a broadcast status have all ones indicating a buffer ready to release.

FIG. 16(b) is a continuation of the example shown in FIG. 16(a) wherein the buffer discovered in the third scan has been released. Because the scanner 400 has discovered a buffer to release, the scanning period is halved as shown in the middle of FIG. 16(b). The following two scans, however, are unsuccessful and the dynamic scanning procedure is doubled as shown by the first scan of FIG. 16(c).

Is to be understood that doubling and halving the scanning period are illustrative examples of the invention. Although doubling and halving of a scanning period has implementation advantages because a simple bit shift operation can perform this calculation efficiently, one of ordinary skill in the art could use other scanning period factors (such as three or four) and could additionally require three or four unsuccessful scans before doubling the scanning period.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for managing the transfer of packets, comprising:
    a plurality of ports for receiving and transmitting packets;
    a shared memory subdivided into a plurality of buffers including unicast frame buffers and broadcast frame buffers;
    a bus interconnecting said shared memory and said plurality of ports;
    a linked list of free unicast packet buffers listing each of the unicast frame buffers that are currently free;
    a linked list of free broadcast packet buffers listing each of the broadcast frame buffers that are currently free;
    an output queue linked list for each of said plurality of ports, wherein each of said output queue linked lists includes a listing of the buffers utilized by the associated port to transmit a packet;
    a linked list of used broadcast packet buffers listing all of the broadcast packet buffers currently in use; and
    a buffer managed connected to said shared memory and to said plurality of ports via said bus;
    said buffer manager accessing said linked list of free unicast packet buffers, said linked list of free broadcast packet buffers, said output queue linked lists and said linked list of used broadcast packet buffers to manage unicast and broadcast packet receiving and transmitting between the plurality of ports such that the packets are kept in a FIFO order.

2. The system for managing the transfer of packets according to claim 1,
    said buffer manager accessing said linked list of free unicast packet buffers or the linked list of free broadcast packet buffers to designate a next free buffer before transmitting a packet from a first one of said ports to a second one of said ports, updating the linked list of free broadcast or unicast packet buffers to exclude the designated buffer, and updating the output queue linked list for the first port to include the designated buffer.

3. The system for managing the transfer of packets according to claim 2,
    said buffer manager updating the linked list of used broadcast packet buffer to include the designated buffer.

4. The system for managing the transfer of packets according to claim 3,
    wherein each entry in the linked list of used broadcast packet buffers includes a field indicating broadcast status.

5. The system for managing the transfer of packets according to claim 4, further comprising:
    a scanner for scanning the broadcast status field to determine if an associated broadcast packet buffer can be released,
    said buffer manager updating the broadcast status field after transmitting a corresponding broadcast packet;
    said buffer manager releasing a broadcast packet buffer based on an output of said scanner.

6. The system for managing the transfer of packets according to claim 5,
    said broadcast status field including a number of bits equal to the number of said ports,
    said scanner scanning the broadcast status field in the linked list of used broadcast buffers and permitting release of the broadcast buffer if the scanned broadcast status field indicates that all ports have transmitted the broadcast packet.

7. The system for managing the transfer of packets according to claim 6,
    said scanner scanning the linked list of used broadcast buffers for a predetermined scanning depth and permitting release of a broadcast buffer if a corresponding one of the scanned broadcast status fields indicates that all ports have transmitted the corresponding broadcast packet.

8. The system for managing the transfer of packets according to claim 7,
    said scanner dynamically scanning the linked list of used broadcast buffers once every scanning period.

9. The system for managing the transfer of packets according to claim 8,
    said buffer manager dynamically adjusting the scanning period according to results of a current scan by said scanner.

10. The system for managing the transfer of packets according to claim 8,
    said buffer manager decreasing the scanning period if a current scan by said scanner finds a broadcast buffer to release.

11. The system for managing the transfer of packets according to claim 10,
    said buffer manager maintaining the scanning period above a minimum scanning period value.

12. The system for managing the transfer of packets according to claim 8,
    said buffer manager adjusting the scanning period according to results of at least one previous scan step and a current scan by said scanner.

13. The system for managing the transfer of packets according to claim 12, said buffer manager increasing the scanning period if a current scan and at least one previous scan by said scanner do not find a broadcast buffer to release.

14. The system for managing the transfer of packets according to claim 13, said buffer manager maintaining the scanning period below a maximum scanning period value.

15. A method of sharing a memory in a packet switching network having a plurality of ports connected to the memory via a bus, the method comprising the steps of:

dividing the memory into a plurality of buffers including unicast frame buffers;

requesting a buffer from a linked list of free unicast buffers;

transmitting the unicast packet from a first port to a second port of the packet switching network by
storing the unicast packet from a first port in the buffer requested in said requesting step, and
receiving the unicast packet from the buffer requested in said requesting step with the second port, releasing the buffer utilized in said transmitting step; and
updating the linked list of free unicast buffers,
wherein if a broadcast packet is to be transferred:
said dividing step further divides the memory into a plurality of broadcast frame buffers;
said requesting step requests a buffer from a linked list of free broadcast buffers; and
said transmitting step transmits the broadcast packet from a first port to all of the other ports of the packet switching network by
storing the broadcast packet from the first port in the broadcast buffer requested in said requesting step,
updating the linked list of free broadcast buffers,
updating an output queue linked list to include the broadcast buffer utilized in said storing step,
updating a linked list of used broadcast buffers to include the broadcast buffer utilized in said storing step, and
receiving the broadcast packet from the buffer requested in said requesting step with the other ports of the packet switching network.

16. The method according to claim 15,
determining if the broadcast buffer utilized in said transmitting step can be released; and
releasing the broadcast buffer utilized in said transmitting step based on said determining step.

17. The method according to claim 16,
said determining step including a substeps of scanning a broadcast status field in the linked list of used broadcast buffers and permitting release of the broadcast buffer if the scanned broadcast status field indicates that all ports have transmitted the broadcast packet.

18. The method according to claim 17,
said scanning substep scanning the linked list of used broadcast buffers for a predetermined scanning depth,
said permitting step permitting release of a broadcast buffer if a corresponding one the scanned broadcast status fields indicates that all ports have transmitted the corresponding broadcast packet.

19. The method according to claim 17,
said scanning substep dynamically scanning the linked list of used broadcast buffers once every scanning period.

20. The method according to claim 19, further comprising the steps of:

adjusting the scanning period according to results of a current scanning step.

21. The method according to claim 20,
said adjusting step decreasing the scanning period if a current scanning step finds a broadcast buffer to release.

22. The method according to claim 21, further comprising the step of:
maintaining the scanning period above a minimum scanning period value.

23. The method according to claim 19, further comprising the steps of:
adjusting the scanning period according to results of at least one previous scanning step and a current scanning step.

24. The method according to claim 23,
said adjusting step increasing the scanning period if a current scanning step and at least one previous scanning step do not find a broadcast buffer to release.

25. The method according to claim 24, further comprising the step of:
maintaining the scanning period below a maximum scanning period value.

26. In a packet switching network having a plurality of ports and a shared memory subdivided into a plurality of unicast packet buffers and broadcast packet buffers, a data structure for sharing the memory, comprising:

a linked list of free unicast packet buffers wherein each entry includes a link to a next available unicast packet buffer in the shared memory;

a linked list of free broadcast packet buffers wherein each entry includes a link to a next, available broadcast packet buffer in the shared memory;

a linked list for each output queue wherein each entry in each linked list for output queue includes a next buffer pointer pointing to a next buffer in the linked list for output queue and a field indicating whether the next buffer is a broadcast or unicast packet buffer; and a linked list of used broadcast packet buffers wherein each entry includes a link to a next used broadcast packet buffer.

27. The packet switching network having the plurality of ports and the shared memory subdivided into the plurality of unicast packet buffers and broadcast packet buffers and the data structure according to claim 26, wherein for broadcast packets,
each entry in each linked list for output queue further includes a field indicating broadcast status, and a plurality of fields having a first subfield pointing to a next buffer for port #i and a second subfield indicating whether the next buffer for port #i is a broadcast or unicast packet buffer.

28. The packet switching network having the plurality of ports and the shared memory subdivided into the plurality of unicast packet buffers and broadcast packet buffers and the data structure according to claim 26,
wherein each entry in the linked list of used broadcast packet buffers includes a field indicating broadcast status.

29. The packet switching network having the plurality of ports and the shared memory subdivided into the plurality of unicast packet buffers and broadcast packet buffers and the data structure according to claim 28, said broadcast status field indicating a number of bits equal to the number of ports.

* * * * *